US007682413B2

(12) United States Patent
Sheidler

(10) Patent No.: US 7,682,413 B2
(45) Date of Patent: Mar. 23, 2010

(54) AIR PRECLEANER ARRANGEMENT FOR AN INTERNAL COMBUSTION ENGINE COMPRISING TWO CYCLONE FILTERS

(75) Inventor: Alan David Sheidler, Moline, IL (US)

(73) Assignee: Deere & Company, Moline, IL (US)

( * ) Notice: Subject to any disclaimer, the term of this patent is extended or adjusted under 35 U.S.C. 154(b) by 606 days.

(21) Appl. No.: 11/581,511

(22) Filed: Oct. 16, 2006

(65) Prior Publication Data

US 2008/0086989 A1  Apr. 17, 2008

(51) Int. Cl.
*B01D 45/12* (2006.01)
(52) U.S. Cl. .............................. 55/345; 55/337; 55/346; 55/347; 55/385.3; 55/459.1; 55/467; 55/471; 123/198 E
(58) Field of Classification Search .................... 55/337, 55/345–347, 385.3, 459.1, 459.5, 467, 471; 123/198 E
See application file for complete search history.

(56) References Cited

U.S. PATENT DOCUMENTS

| 2,341,087 | A | * | 2/1944 | Dunham ....................... 55/343 |
| 3,870,489 | A | * | 3/1975 | Shaddock ...................... 55/314 |
| 4,407,663 | A | * | 10/1983 | Hawley ........................ 55/347 |
| 4,537,608 | A | * | 8/1985 | Koslow ........................ 55/337 |
| 5,472,463 | A | * | 12/1995 | Herman et al. ................. 55/319 |
| 6,932,849 | B2 | * | 8/2005 | Sheidler et al. ............... 55/347 |
| 2003/0217534 | A1 | * | 11/2003 | Krisko et al. .................. 55/337 |
| 2004/0216611 | A1 | * | 11/2004 | Moredock ..................... 95/271 |
| 2005/0016138 | A1 | * | 1/2005 | Sheidler et al. ............... 55/347 |
| 2005/0274094 | A1 | * | 12/2005 | DeMarco ..................... 55/356 |
| 2006/0101795 | A1 | * | 5/2006 | Krisko et al. .................. 55/337 |
| 2007/0137152 | A1 | * | 6/2007 | Xu et al. ...................... 55/321 |
| 2008/0196368 | A1 | * | 8/2008 | Waibel ....................... 55/385.3 |
| 2008/0209869 | A1 | * | 9/2008 | Rother et al. ................. 55/337 |

FOREIGN PATENT DOCUMENTS

DE  2421358 A1  11/1975
DE  103 36 206  8/2003

OTHER PUBLICATIONS

European Search Report dated Jan. 28, 2008, (5 pages).

* cited by examiner

*Primary Examiner*—Jason M Greene
*Assistant Examiner*—Dung Bui

(57) ABSTRACT

An air precleaner arrangement for an internal combustion engine comprises a screen, a shroud, a fan, a first cyclone filter and a second cyclone filter. The screen has air permeable openings sized to retain debris. A fan is cooperating with the screen to provide an air stream from an upstream surface through the openings of the screen to a downstream surface. The shroud encloses the fan and the screen. The first cyclone filter has an air inlet receiving air on the downstream surface of the screen, an air outlet and a scavenge port in communication with interior of the screen and thus with the air stream of the fan. The second cyclone filter has an air inlet connected to the air outlet of the first cyclone filter, an air outlet connected to the air inlet of the internal combustion engine and a scavenge port connected to an exhaust venturi in the exhaust stream of the engine.

19 Claims, 3 Drawing Sheets

AIR PRECLEANER ARRANGEMENT FOR AN INTERNAL COMBUSTION ENGINE COMPRISING TWO CYCLONE FILTERS

FIELD OF THE INVENTION

The present invention relates to an air precleaner arrangement for an internal combustion engine.

BACKGROUND OF THE INVENTION

An internal combustion engine of a self propelled vehicle or machine needs to be provided with clean air for the combustion process. Especially if the vehicle or machine is used in an agricultural harvesting environment, where the ambient air contains large amounts of dust and plant material being generated from the harvesting machinery, an efficient air precleaning and filter arrangement is required. For a combine harvester, this is in the prior art generally done with a single large cyclone precleaner and a porous filter downstream the cyclone precleaner to provide the final stage of filtering needed for the engine combustion air.

The cyclone precleaner, also named vortex-type filter, comprises a vortex generating inlet passage and a cooperating outlet passage. Both passages may be cylindrical or somewhat conical, and are axially aligned to each other. The entrance of the outlet passage is smaller than the exit of the inlet passage and located proximate to the exit of the inlet passage. The passages extend within a filtration chamber that is separated from the entrance of the inlet passage and the exit of the outlet passage. From this filtration chamber, the separated material is drawn by an external source through an aspiration port, also named scavenge port.

In operation, unfiltered fluid enters the inlet passage, where a vortex motion is imparted in the fluid flow. The heavier material in the flow, be it fluid or debris, is thrown radially outward toward the inlet passage walls by the centrifugal force of the vortex motion. Thus, the flow is separated into a lighter portion at the center of the inlet passage and a heavier portion near the wall of the inlet passage. As the fluid exits the inlet passage, the heavier separated portion flows past the entrance of the smaller outlet passage and into the filtration chamber, while the lighter filtered portion enters and flows through the outlet passage. The material from the filtration chamber is drawn through the scavenge port into exhaust flow of the engine.

A problem with this precleaner arrangement is that the single large cyclone filter is in a number of cases not efficient enough to pre-filter enough of the dust out of the air stream. This results in heavy dust loading on the air filter element. The life of this filter element is thus reduced and when the filter gets plugged, the air flow to the engine is restricted and the engine loses power. The filter then either needs to be replaced with a new one or blown out with compressed air, what is a time-consuming and filthy task. In some crops and conditions, the filter needs to be serviced in this way as often as once per day. This is unacceptable to most users.

In DE 103 36 206 A, it was proposed to use a block containing a number of cyclone precleaners arranged in parallel, whereby two such blocks are arranged in series upstream and downstream a turbocharger, for precleaning combustion air for an engine of an agricultural vehicle. This document does not disclose how the scavenge ports of the cyclone filters are aspirated.

Thus, there is a need for a precleaner arrangement for an internal combustion engine providing an efficient precleaning effect.

It is an object of the present invention to provide an effective precleaner arrangement for an internal combustion engine.

SUMMARY OF THE INVENTION

An internal combustion engine has an air inlet and an exhaust port. An air precleaner arrangement for the air inlet of the engine comprises a screen having air permeable openings sized to retain debris, a shroud located downstream the screen, a fan mounted in the shroud and arranged to provide an air stream through the openings of the screen, a first cyclone filter and a second cyclone filter. An air inlet of the first cyclone filter is located at the downstream surface of the screen. A scavenge port of the first cyclone filter is connected to the interior of the shroud. An air inlet of the second cyclone filter is connected to the air outlet of the first cyclone filter, and an air outlet of the second cyclone filter is connected to the air inlet of the internal combustion engine.

During operation, the fan mounted within the shroud provides an air stream through the openings of the screen. Larger debris, as larger parts of plants like straw, is retained by the screen. Combustion air for the engine is taken from the coarsely filtered air stream downstream the screen and gets into the air inlet of the first vortex filter which is preferably a single cyclone filter. The first vortex filter separates heavier particles (like coarse dust, chaff, barley beards, straw particles etc.) from the received air, which are aspirated through the scavenge port of the first vortex filter into the interior of the shroud by means of the vacuum generated by the fan and finally blown out of the machine by the fan's air stream. The air from the air outlet of the first vortex filter gets into the air inlet of the second vortex filter which preferably comprises a bank of smaller cyclones that are optimized to remove finer dust particles. The second vortex filter removes fine dust from the air, which is at the second vortex filter's air outlet finally provided to the air inlet of the internal combustion engine, directly or via a porous air filter and/or a turbocharger and optionally a charge air cooler. The scavenge port of the second vortex filter can aspirate to the engine exhaust or to a separate suitable blower.

It is an advantage of the invention that the combustion air for the engine is effectively cleaned. Servicing or exchange of an air filter is required only in larger intervals, if at all. Further, it is possible to match the vacuuming of the scavenge ports aspiration to each cyclone filter. The shroud and the scavenge port of the first vortex filter and the connection between them can be dimensioned for optimal vacuum and flow requirements. This can analogously be done with the second vortex filter. Thus, each vortex filter can be optimized independently.

DESCRIPTION OF THE PREFERRED EMBODIMENT

Figure 1:
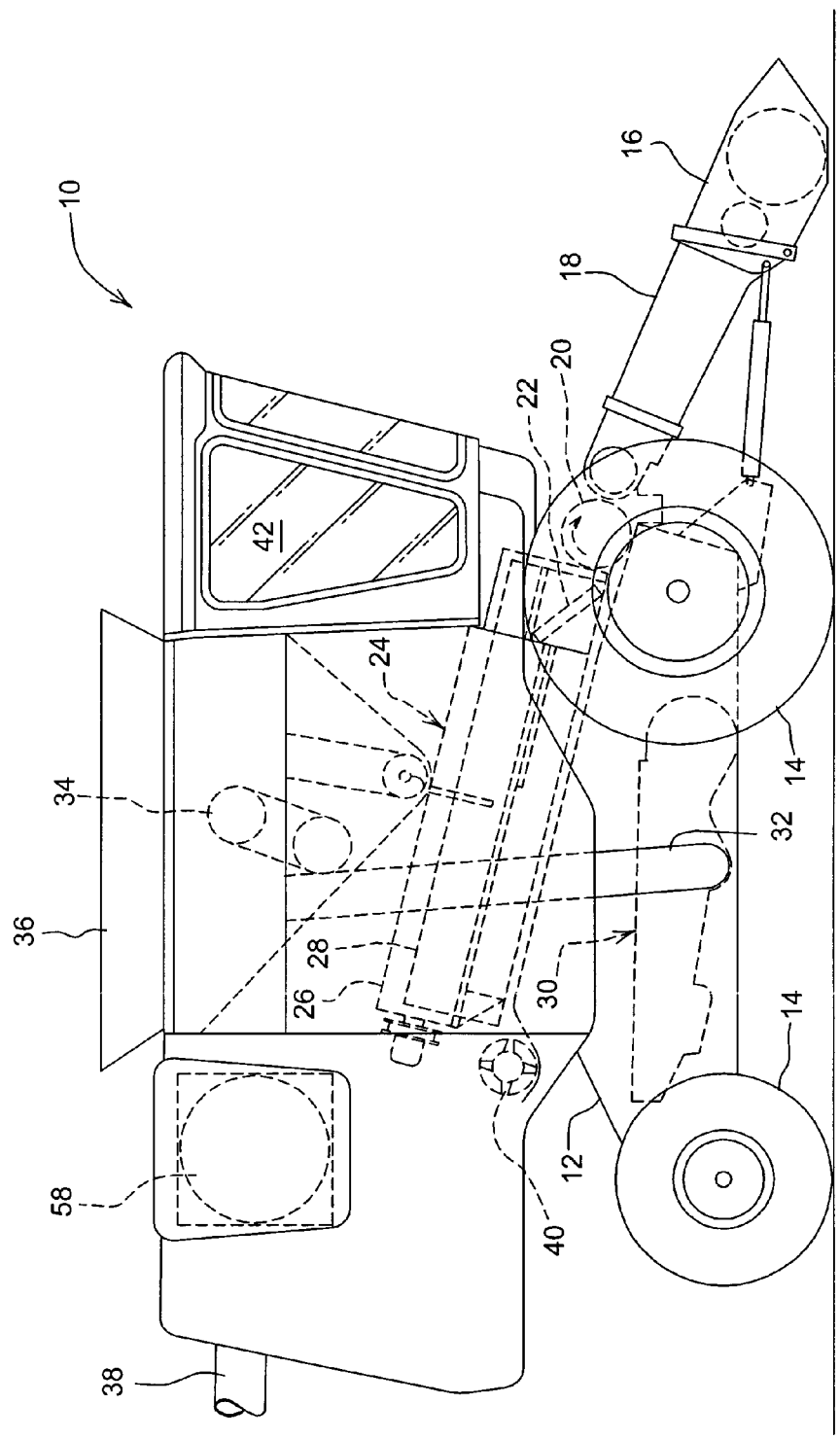
FIG. 1 is a diagrammatic side view of an agricultural machine, and in particular an agricultural combine.

FIG. 1 is a diagrammatic depiction of an agricultural machine 10. In the embodiment shown, agricultural machine 10 is in the form of an agricultural combine. Although the invention is being described as being incorporated into a combine, it is contemplated that the present invention may be used with other types of agricultural machines, like forage harvesters, cotton pickers and self propelled balers.

Agricultural machine 10, in the form of a combine, includes a supporting structure 12. A propulsion unit 14, which may include tires and/or tracks that engage the ground, is coupled to supporting structure 12, and performs propulsion and steering functions. A harvesting platform 16 is used for harvesting a crop and directing the crop to a feederhouse 18. The harvested crop is directed by feederhouse 18 to a beater 20. Beater 20 directs the harvested crop upwardly through an inlet transition section 22 to an axial crop processing unit 24.

Axial crop processing unit 24 is located between, and supported by the side sheets of agricultural machine 10. Axial crop processing unit 24 includes an axial rotor housing 26 and an axial rotor 28 located in axial rotor housing 26. The harvested crop enters axial rotor housing 26 through inlet transition section 22. Axial rotor 28 is provided with an infeed portion, a threshing portion and a separating portion. Axial rotor housing 26 has a corresponding infeed section, a threshing section and a separating section.

Both crop processing portions, the threshing portion and the separating portion, are provided with crop engaging assemblies. The threshing section of the axial rotor housing 26 is provided with a concave and the separating section is provided with a grate. Grain and chaff released from the crop mat falls through the concave and the grate. The concave and grate prevent the passage of crop material larger than grain or chaff from entering a cleaning system 30.

Grain and chaff falling through the concave and grate is directed to cleaning system 30 which removes the chaff from the grain. The clean grain is then directed by a clean grain elevator 32 to a fountain auger 34. Fountain auger 34 directs the grain into a grain tank, or grain compartment, 36. The grain is removed from the grain tank 36 by an unloading auger 38.

As the crop residue, e.g., straw, stalks, chaff, dust, etc., reaches the end of the crop processing unit 24 it is expelled through an outlet to a beater 40. Beater 40 propels the crop residue out the rear of the combine. Downstream the beater 40, a straw chopper (not shown) could be provided. The operation of agricultural machine 10 is controlled from the operator's cab 42.

Figure 2:
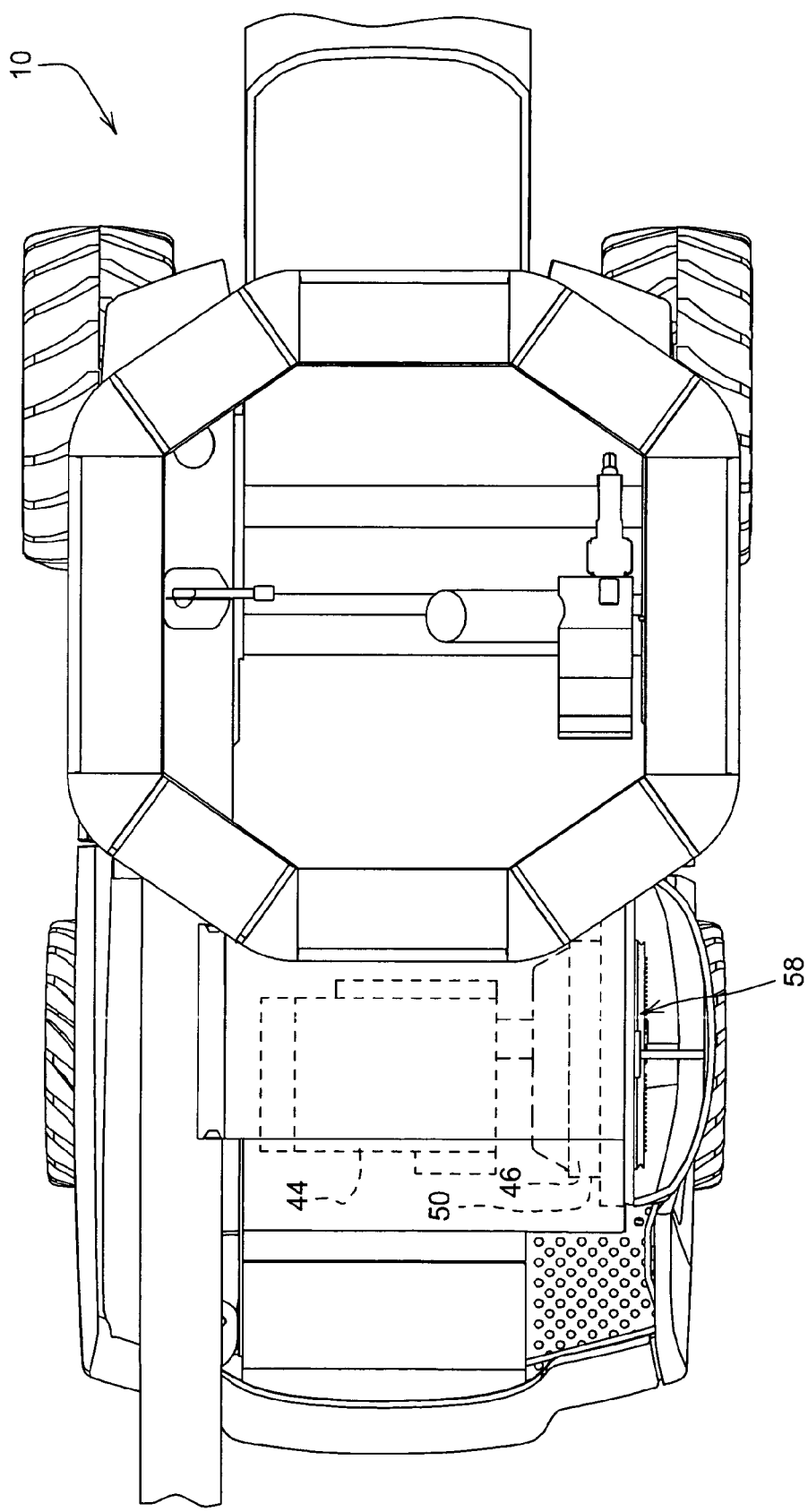
FIG. 2 is a top view of the agricultural machine of FIG. 1.
Figure 3:
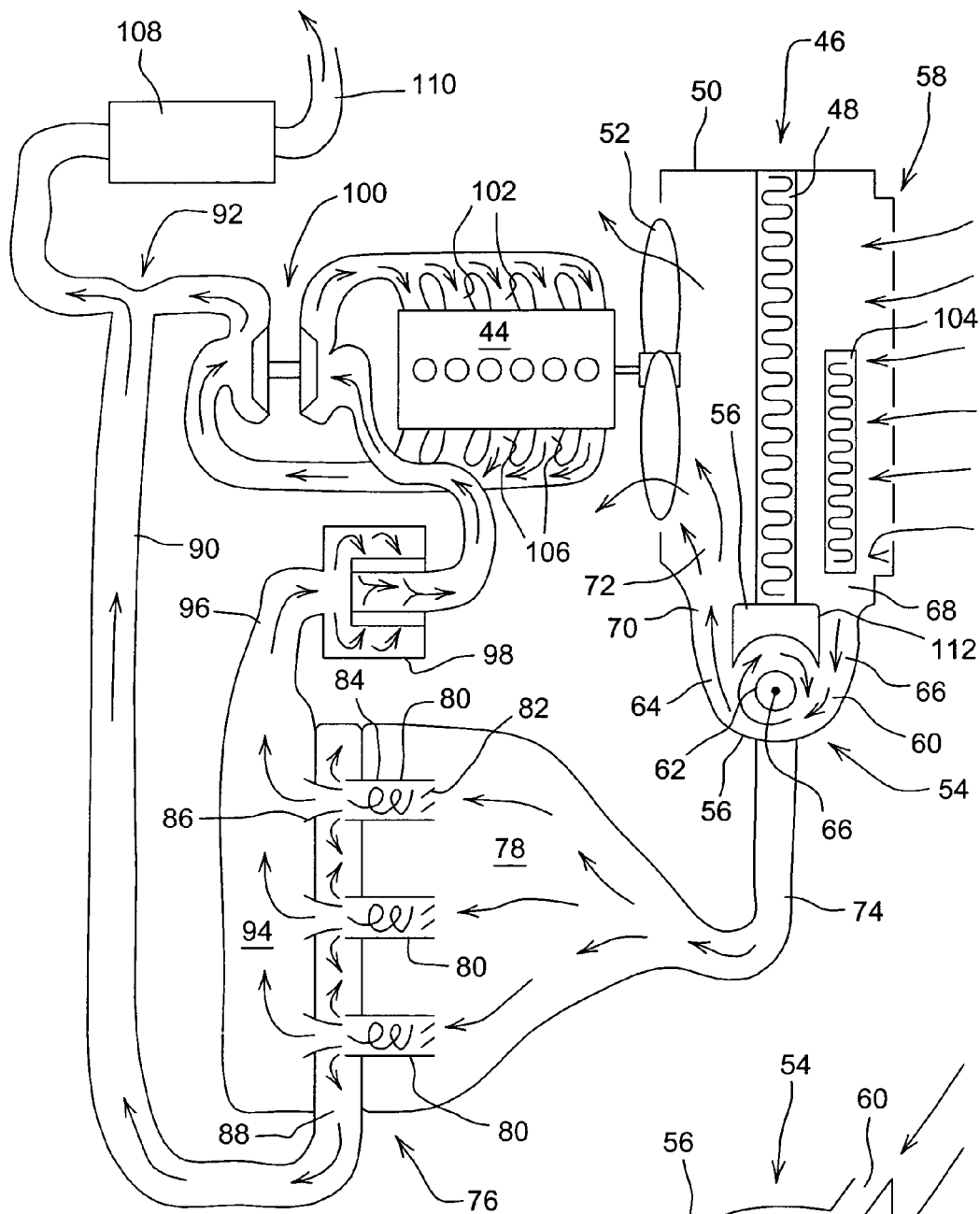
FIG. 3 is a schematic view of a precleaner arrangement embodying the present invention.

Referring to the schematic diagrams of FIGS. 2 and 3, the agricultural machine 10 includes an internal combustion engine 44 that provides the mechanical power needed to perform the propulsion and harvesting operations. Referring also to FIGS. 2 and 3, a cooling package 46 is provided in fluid communication with engine 44. Cooling package 46 includes a radiator 48, but typically also includes a hydraulic oil cooler, and an air conditioning condenser, for example. The radiator 48 is mounted within a shroud 50. A fan 52 having a plurality of fan blades is rotatably driven by the engine 44, and positioned within an opening formed in the shroud 50. Engine 44 can drive fan 52 mechanically or indirectly by means of a hydraulic motor or electric motor. A rotary screen 58 having openings with a size sufficient to leave air through, but to retain larger debris, is mounted to the shroud 50 upstream an air inlet of radiator 48. The screen 58 is a flat circular screen having a woven wire mesh. Means for cleaning the screen 58, including brushes, baffles and vacuum chambers, can be provided at the upstream and/or downstream face of the screen 58.

Figure 4:
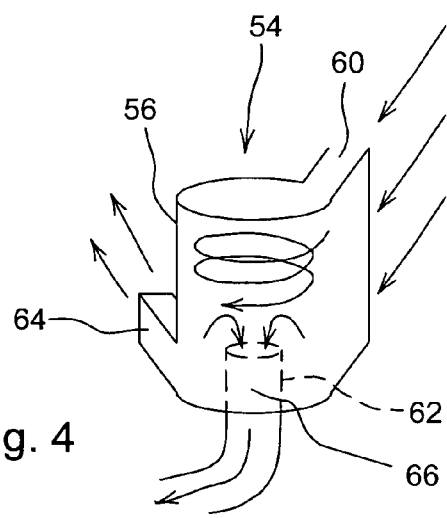
FIG. 4 is a perspective view of an embodiment of a first cyclone filter.

Within the interior of the shroud 50, beneath the radiator 48, a single first vortex filter 54 is provided. The first vortex filter 54 is shown in more detail in FIG. 4. It comprises a cylindrical housing 56 with a tangentially and axially oriented air inlet 60 extending over the entire axial length of housing 56, a radially extending tube 62 mounted coaxially within the housing 56, and a tangentially and axially oriented scavenge port 64 located diametrically opposite the air inlet 60 and extending only over a part of the axial length of housing 56. The air inlet 60 of the first vortex filter 54 is connected by a channel 66 to a space 68 within shroud 50 defined between the downstream face of the screen 58 and the upstream face of radiator 48. Tube 62 defines an air outlet 66 of the first vortex filter 54. The scavenge port 64 of the first vortex filter 54 is connected via a channel 70 to a space 70 within shroud 50 defined between the downstream surface of the radiator 48 and the fan 52. The axis of housing 56 extends parallel to the upstream face of radiator 48 and thus orthogonally to the air flow generated by fan 52.

Tube 62 is connected via a conduit 74 to an air inlet 78 of a second vortex filter 76 that comprises a vortex filter bank 80. The vortex filter bank 80 comprises a plurality of vortex filters arranged in parallel. Each of them is provided with baffles 82 at the inlet, filtration housings 84 and outlets 86 sized smaller than the filtration housings 84. A suitable design of the second vortex filter 76 is described in U.S. Pat. No. 6,932,849 and in DE 103 36 206 A, the context of both being incorporated herein by reference. The filter housings 84 aspirate to a scavenge port 88 connected via a tube 90 to an exhaust venturi tube 92. The outlets 86 are open to a common air outlet 94 of the second vortex filter 76.

The air outlet 94 of the second vortex filter 76 is connected via a tube 96 with a housing 98 containing a porous air filter. The outlet of the air filter housing 98 is connected with the air inlet of a turbo charger 100, the air outlet of which is connected to air inlet ports 102 of engine 44, if required via a charge air cooler 104 located in the air stream generated by the fan 52. The engine 44 comprises exhaust ports 106 that are connected to the exhaust gas inlet of the turbo charger 100. The exhaust gas outlet of the turbo charger 100 is connected via venturi tube 92 to a muffler 108 having an exhaust 110 to the environment.

During operation, engine 44 rotates and provides power to the agricultural machine 10 to perform the propulsion and harvesting operations. Further, engine drives fan 52 which in turn provides a vacuum in shroud 50 and sucks ambient air through the openings of the screen 58. The screen 58 sieves out larger debris like leaves and straw. The air flow of the fan 52 penetrates between fins of radiator 48 and of the charge air cooler 104, if provided. Further, the air flow of the fan 52 streams along engine 44 and is then finally exhausted to the environment. A sealing element with a wall 112 prevents air leaks between the first vortex filter 54 and the radiator 48.

A part of the air passing through screen 58 gets via channel 66 from space 68 into the air inlet 60 of the first vortex filter 54. Due to the tangential arrangement of the air inlet 60, the air stream is forced onto a helical path within in the cylindrical housing 56. Heavier particles, mainly coarse dust, chaff, etc. stay due to the centrifugal forces close to the wall of housing 56 and are aspirated into the scavenge port 64, from where they are sucked out by the vacuum generated by fan 52 via channel 70 and space 72. Precleaned air gets via air outlet 66 and conduit 74 into the air inlet 78 of second vortex filter 76 which in turn removes fine dust from the air. The second vortex filter 76 is aspirated via tube 90 and venturi tube 92 into the exhaust gas stream of engine 44. At the air outlet 94 of the second vortex filter 76, relatively clean air is provided. The precleaned air gets from air outlet 96 to the inlet ports 102 of engine 44, via filter 98, turbocharger 100 and optionally the charge air cooler 104. The exhaust gases of the engine 44 drive the turbo charger 100 and are exhausted to the environment via venturi tube 92 and muffler 108.

Having described the preferred embodiment, it will become apparent that various modifications can be made without departing from the scope of the invention as defined in the accompanying claims.

The invention claimed is:

1. An air precleaner arrangement for an internal combustion engine having an air inlet and an exhaust port, the air precleaner arrangement comprising:
a screen having air permeable openings sized to retain debris, the screen having a downstream surface and an upstream surface;
a shroud at the downstream surface of the screen;
a fan mounted in the shroud and arranged to provide an air stream through the openings of the screen;
a first cyclone filter having an air inlet, an air outlet and a scavenge port; wherein the air inlet of the first cyclone filter is located at the downstream surface of the screen and the scavenge port is connected with the shroud;
a second cyclone filter having an air inlet, an air outlet and a scavenge port, the air inlet of the second cyclone filter connected to the air outlet of the first cyclone filter, and the air outlet of the second cyclone filter connected to the air inlet of the internal combustion engine.

2. An air precleaner arrangement according to claim 1, wherein the fan is configured to provide an air stream through the openings of the screen which retains larger debris, combustion air for the engine is taken from the air stream downstream the screen and gets into the air inlet of the first cyclone filter that separates heavier particles from the air, which are aspirated through the scavenge port of the first cyclone filter into the interior of the shroud by means of the vacuum generated by the fan, air from the air outlet of the first cyclone filter gets into the air inlet of the second cyclone filter that removes fine dust from the air, which is from the air outlet of the second cyclone filter provided to the air inlet of the internal combustion engine.

3. An air precleaner arrangement according to claim 1, wherein the scavenge port of the second cyclone filter is connected to a venturi tube that is connected to the exhaust port of the engine.

4. An air precleaner arrangement according to claim 1, wherein the second cyclone filter comprises a plurality of cyclone filters arranged in parallel.

5. An air precleaner arrangement according to claim 1, further comprising a porous air filter arranged between the air outlet of the second cyclone filter and the air inlet of the internal combustion engine.

6. An air precleaner arrangement according to claim 1, further comprising a turbocharger arranged between the air outlet of the second cyclone filter and the air inlet of the internal combustion engine.

7. An air precleaner arrangement according to claim 6, further comprising a charge air cooler arranged between the turbocharger and the air inlet of the internal combustion engine.

8. An air precleaner arrangement according to claim 7, further comprising a porous air filter arranged between the air outlet of the second cyclone filter and the turbocharger.

9. An air precleaner arrangement according to claim 1, wherein the first cyclone filter comprises a cylindrical housing with a tangentially and axially oriented air inlet extending over the axial length of housing, a radially extending tube mounted coaxially within the housing defining the air outlet of the first cyclone filter, and a tangentially and axially oriented scavenge port located diametrically opposite the air inlet and extending over a part of the axial length of the housing.

10. An internal combustion engine assembly comprising:
an internal combustion engine with an air inlet and an exhaust port;
a screen having air permeable openings sized to retain debris, the screen having a downstream surface and an upstream surface;
a shroud at the downstream surface of the screen;
a fan mounted in the shroud and arranged to provide an air stream through the openings of the screen;
a first cyclone filter having an air inlet, an air outlet and a scavenge port, wherein the air inlet of the first cyclone filter is located at the downstream surface of the screen and the scavenge port opens towards the shroud;
a second cyclone filter having an air inlet, an air outlet and a scavenge port, the air inlet of the second cyclone filter connected to the air outlet of the first cyclone filter, and the air outlet of the second cyclone filter connected to the air inlet of the internal combustion engine.

11. An assembly according to claim 10, wherein during operation, the fan provides an air stream through the openings of the screen which retains larger debris, combustion air for the engine is taken from the air stream downstream the screen and gets into the inlet of the first cyclone filter that separates heavier particles from the air, which are aspirated through the scavenge port of the first cyclone filter into the interior of the shroud by means of the vacuum generated by the fan, air from the air outlet of the first cyclone filter gets into the air inlet of the second cyclone filter that removes fine dust from the air, which is from the air outlet of the second cyclone filter provided to the air inlet of the internal combustion engine.

12. An assembly according to claim 10, wherein the scavenge port of the second cyclone filter is connected to a venturi tube that is connected to the exhaust port of the engine.

13. An assembly according to claim 10, wherein the second cyclone filter comprises a plurality of cyclone filters arranged in parallel.

14. An assembly according to claim 10, wherein a porous air filter is arranged between the air outlet of the second cyclone filter and the air inlet of the internal combustion engine.

15. An assembly according to claim 10, wherein a turbocharger is arranged between the air outlet of the second cyclone filter and the air inlet of the internal combustion engine.

16. An assembly according to claim 15, wherein a charge air cooler is arranged between the turbocharger and the air inlet of the internal combustion engine.

17. An assembly according to claim 16, wherein a porous air filter is arranged between the air outlet of the second cyclone filter and the turbocharger.

18. An assembly according to claim 10, wherein the first cyclone filter comprises a cylindrical housing with a tangentially and axially oriented air inlet extending over the axial length of housing, a radially extending tube mounted coaxially within the housing defining the air outlet of the first cyclone filter, and a tangentially and axially oriented scavenge port located diametrically opposite the air inlet and extending over a part of the axial length of the housing.

19. An agricultural harvesting machine comprising:
an internal combustion engine with an air inlet and an exhaust port;
a screen having air permeable openings sized to retain debris, the screen having a downstream surface and an upstream surface;

a shroud at the downstream surface of the screen;
a fan mounted in the shroud and arranged to provide an air stream through the openings of the screen;
a first cyclone filter having an air inlet, an air outlet and a scavenge port, wherein the air inlet of the first cyclone filter is located at the downstream surface of the screen and the scavenge port is connected with the shroud;
a second cyclone filter having an air inlet, an air outlet and a scavenge port, the air inlet of the second cyclone filter connected to the air outlet of the first cyclone filter, and the air outlet of the second cyclone filter connected to the air inlet of the internal combustion engine.

* * * * *